(12) United States Patent
Von Huth Smith et al.

(10) Patent No.: US 6,321,792 B1
(45) Date of Patent: Nov. 27, 2001

(54) FLOW CONDUIT AND MEANS FOR ENLARGING THE SURFACE THEREOF TO PROVIDE COOLING, AND A FUEL PIPE, AND A METHOD FOR THE MANUFACTURE THEREOF

(75) Inventors: Ulf Von Huth Smith, Aabenraa; Peter Johnsen, Tønder; Karl Boysen, Kolding; Peter N. Køhling, Rødekro, all of (DK)

(73) Assignee: Norsk Hydro ASA, Oslo (NO)

( * ) Notice: Subject to any disclaimer, the term of this patent is extended or adjusted under 35 U.S.C. 154(b) by 0 days.

(21) Appl. No.: 09/719,100

(22) PCT Filed: Jun. 7, 1999

(86) PCT No.: PCT/DK99/00300

§ 371 Date: Dec. 8, 2000

§ 102(e) Date: Dec. 8, 2000

(87) PCT Pub. No.: WO99/67590

PCT Pub. Date: Dec. 29, 1999

(30) Foreign Application Priority Data

Jun. 8, 1998 (DK) .............................................. 1998 00792

(51) Int. Cl.⁷ .................................. F15D 1/00; F28F 1/42
(52) U.S. Cl. ........................... 138/38; 138/106; 165/179; 165/183
(58) Field of Search ..................... 138/38, 106; 165/179, 165/181, 183, 178

(56) References Cited

U.S. PATENT DOCUMENTS

| 2,322,341 | * | 6/1943 | Booth . | |
|---|---|---|---|---|
| 2,405,722 | * | 8/1946 | Villier . | |
| 2,566,318 | * | 9/1951 | Dalin et al. . | |
| 3,145,456 | * | 8/1964 | Johnson . | |
| 3,735,465 | * | 5/1973 | Tibbetts et al. | 29/202 D |
| 4,114,598 | * | 9/1978 | Von Leeuwen | 126/271 |
| 4,241,727 | * | 12/1980 | Toti | 138/156 |
| 4,296,539 | * | 10/1981 | Asami | 165/133 |
| 4,336,793 | * | 6/1982 | Shearn et al. | 126/450 |
| 4,479,359 | | 10/1984 | Pelloux-Gervais . | |
| 4,487,256 | * | 12/1984 | Lutjens et al. | 165/183 |
| 5,174,371 | * | 12/1992 | Grillo | 165/183 |
| 5,467,818 | * | 11/1995 | Buckley, Jr. | 165/178 |
| 5,950,720 | * | 9/1999 | Klix | 165/179 |

FOREIGN PATENT DOCUMENTS

| 363398 | 1/1974 | (DE) . |
|---|---|---|
| 2627967 | 1/1977 | (DK) . |
| 0038710 | 10/1981 | (EP) . |
| 0807756A2 | 11/1997 | (EP) . |
| 1.479.486 | 3/1967 | (FR) . |
| 94/23257 | 10/1994 | (WO) . |

* cited by examiner

Primary Examiner—James Hook
(74) Attorney, Agent, or Firm—Wenderoth, Lind & Ponack, L.L.P.

(57) ABSTRACT

A flow conduit includes surface-enlarging members for cooling fluid in the flow conduit. The surface-enlarging members include cooling blades that extend outwards and downwards from the surface of the flow conduit.

17 Claims, 2 Drawing Sheets

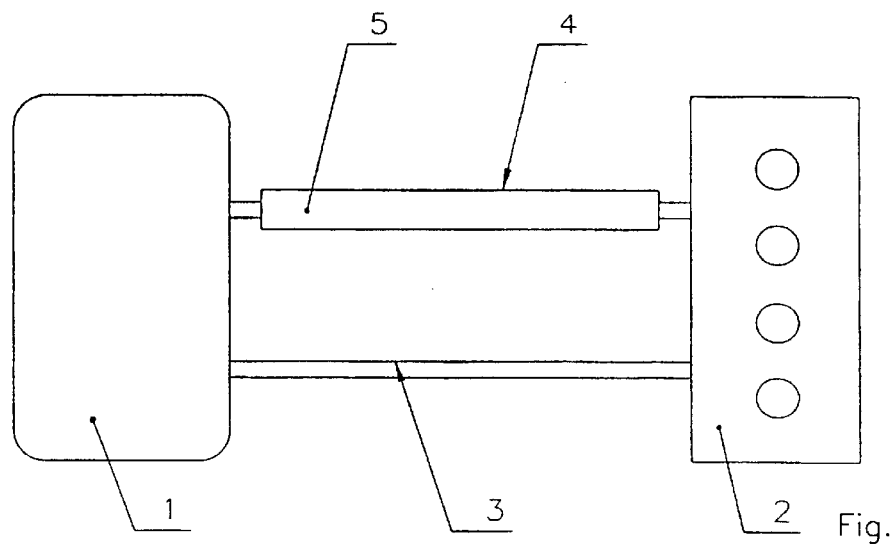
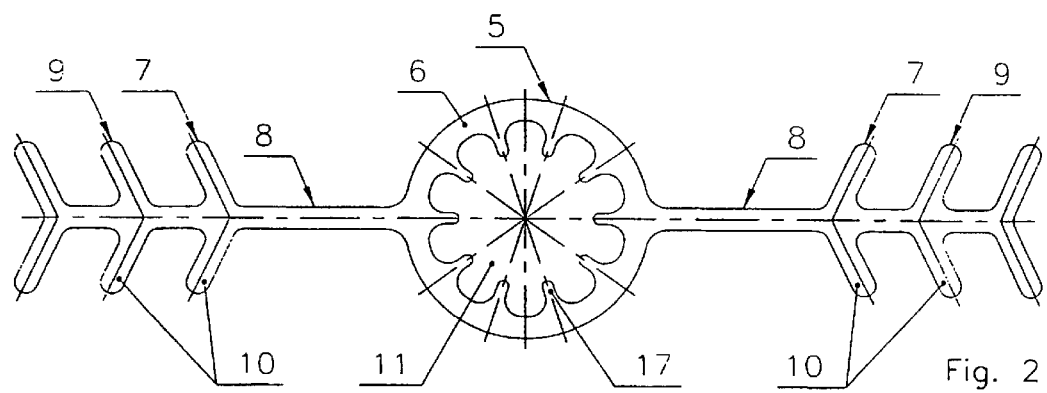

FLOW CONDUIT AND MEANS FOR ENLARGING THE SURFACE THEREOF TO PROVIDE COOLING, AND A FUEL PIPE, AND A METHOD FOR THE MANUFACTURE THEREOF

BACKGROUND OF THE INVENTION

The present invention relates to a flow conduit and surface enlarging means for cooling the fluid contained in the flow conduit. The invention further relates to a fuel pipe with one or more angulations for establishing flow communication between a tank and a motor installation in a vehicle, and a method for the manufacture thereof.

The fuel system in a vehicle serves to supply fuel to the motor from a tank installed in that vehicle. The fuel is pumped into an advance conduit leading to the motor. The fuel which is not consumed in the motor is extremely hot and is pumped back into the tank via a return conduit.

U.S. Pat. No. 4,479,359 teaches a conduit for heating cryogenic fluid. In particular, a heating tube comprises a cylindrical tube having both internal and external fins. The external fins comprise fins extending upwardly from the cylindrical tube. Thus, dirt may accumulate between these fins so that the heat exchanging characteristics will be reduced or vary depending on the amount of dirt accumulated in the spaces between the fins.

WO 94/23257 discloses a heat exchanger that has among its objects to cool fuel in the fuel system of a vehicle. The cooler in this arrangement has been inserted between two conduits in the return conduit. However, this cooler is very space-intensive, and in that cooler a very large loss of pressure occurs in the return conduit which means that a large pumping capacity is required to return the amount of fuel in the return conduit to the tank.

EP-0 807 756 teaches a fuel system for a vehicle wherein a tubular section is inserted. The tubular section has axially oriented cooling ribs for cooling the fuel in the advance and return conduits in the fuel system. At each of its ends, this tubular section is connected by means of tubes to the motor and tank, respectively. The tubular section comprises two parallel flow conduits and is provided with cooling ribs that allow the fuel to be cooled in a simple manner by the streams of air underneath the bottom of the vehicle.

The fuel system according to EP-0 807 756 eliminates the drawbacks in connection with pressure drops and large pumping capacity, and common tubing underneath the bottom is also utilized which saves space compared to previous designs. However, dirt may accumulate on this cooling profile that may deposit on top of and between the cooling ribs and thus reduce the cooling effect or even have an insulating effect on the profile tubing. Moreover, this known type of fuel pipe comprises mechanical joints, such as soldered joints between fuel tubing, connector tubing and cooler tubing. Such joints present: a risk of leak. This risk is greatly increased when the fuel is to be advanced in the fuel pipe under pressure. It is therefore desirable to be able to manufacture a fuel system with a minimum of joints, especially welded joints and soldered joints, in order to hereby reduce the risk of leaks occurring due to a weak joint.

In case of motors based on recently developed technology, a marked increase in the pressure and temperature of the fuel may occur. The temperature may become extremely elevated which gives rise to problems in connection with fuel tanks made of plastics and/or components in connection therewith. Likewise the fuel, such as the diesel oil, may react chemically with the plastic parts of the tank whereby the tank as well as the fuel can suffer damage. Moreover the fuel can also suffer damage such as a consequence of boiling at the elevated temperatures. In the light of this it is, in connection with such novel motor installations, of the utmost importance to cool the fuel effectively, and many producers thus require that the temperature of the fuel must be kept below a suitably low temperature.

SUMMARY OF THE INVENTION

In view of these problems, it is the object of the invention to provide a flow conduit that remedies the above-mentioned drawbacks, and whereby the stipulated requirements to cooling can be complied with.

The invention consists of a flow conduit of the kind described above wherein the surface-enlarging means comprise cooling blades that extend outwards and/or downwards from surface parts of the flow conduit. The flow conduit features an upwardly facing surface portion which is exclusively planar and/or convex.

With a flow conduit according to the invention for cooling fuel, adequate cooling of the fuel is obtained in all conditions. The particular configurations of the flow conduit and the surface-enlarging means prevent accumulation of dirt in the spaces between the cooling blades, or on the upwardly facing surface part of the profile, since dirt, if any, will drop out of the spaces and the upwardly facing surface portion by itself. The surface-enlarging means on the flow conduit are thus self-cleaning.

The configuration wherein the cooling blades of the flow conduit feature a bendable base section and a section provided with cooling fins allows the profile to be extruded with a relatively flat contour following so that the cooling blades can be bent downwards to become self-cleaning. Thus, in the preferred embodiment of the profile according to the invention, the cooling fins in the outer section are inclined relative to the cooling blades in such a manner that the cooling fins point away from the tubular section. Moreover, two cooling blades can be provided that are, at their base sections, bendable in such a manner that the cooling fins exhibit downwardly inclining surfaces. Thus, the self-cleaning function is ensured on both sides of the cooling blades, the cooling fins on both sides of the cooling blades all featuring a downwardly inclining surface.

The flow conduit according to the invention is in one embodiment an extruded aluminum profile. Aluminum is extremely heat-conductive and easily deformable which means that the profile according to this embodiment is uncomplicated to manufacture by extrusion and the material thus chosen also yields an adequate cooling effect. In one embodiment of the flow conduit, it is made with internal cooling fins. Thus, a further cooling of the flow medium in the conduit is obtained.

In a further embodiment, the flow conduit consists of several interconnected elements comprising an internal tubular element and an external cooling element with cooling blades. The outer surface of the tubular elements abuts on surface portions of the cooling element. Thus, the cooling element with the cooling blades can be mounted subsequently on those sections of the flow conduit where it is most convenient. For instance, the cooling element can be soldered onto the surface of the flow conduit to provide adequate thermal connection between the flow conduit and the cooling element. Also, attachment by mechanical deformation may result in an adequate thermal connection between the elements and is therefor a further option.

Additionally, the invention relates to a fuel pipe configured as a flow conduit according to the first aspect of this invention wherein the flow conduit exhibits one or more areas of angulation or attachment. The cooling blades have been removed, and essentially, the flow conduit thus merely consists of a tubular element.

The fuel pipe according to this aspect of the invention is configured in one piece and thus it does not feature soldered joints, welded joints or the like joints that weaken the strength of the flow conduit. Thus, the risk of leaks is considerably reduced.

In a preferred embodiment of the fuel pipe according to the invention, the cooling blades have been cut off or in other way removed from the tubular element at least at the one end of the profile, and the tubular element is configured with coupling means for coupling to a tank or motor installation. Thus, it is possible to configure a coupling stud in the tubular element at the end of the conduit. This means that the number of joints in connection with the conduit is further reduced, because mounting of coupling means on the fuel pipe no longer is necessary when a fuel pipe having this embodiment of the invention is used.

In the preferred embodiment, the conduit is a return conduit in the fuel system of a diesel-driven vehicle. In particular, the return flow of a diesel motor requires cooling of fuel. The cooling profile as well as the fuel pipe according to the invention are primarily intended for cooling return fuel in connection with a diesel drive vehicle, but it has also been found in connection with the invention that the flow conduit and the fuel pipe can also be used for other cooling tasks, including cooling of fuels other than diesel.

In a method of manufacturing a fuel pipe of a profile according to the invention, the cooling profile is extruded whereby a tubular element is formed having a flow conduit and one or more cooling blades that extend diametrically from the tubular element. The cooling blade(s) exhibit(s) a bendable base section and an outer section provided with cooling fins, and the profile is subsequently shaped in accordance with the installation specifications for the fuel pipe.

In a method according to the invention, the profile can be extruded in any length. In the subsequent shaping, the profile is shortened to the desired length. Then the remaining shaping is effected, such as bending and adaptation to fittings relative to the bottom of the vehicle on which the fuel pipe is to be mounted.

In connection with this shaping, the method preferably further comprises a notching of the cooling blades in one or more sections of the profile. The tubular section of the profile is subsequently bent in one or more of the sections. Removal of the cooling blades in those sections of the profile where it is to be bent will facilitate this angulation, the cooling blades otherwise bracing the tubular element.

In a preferred embodiment of the invention the profile can be bent to the desired shape of the fuel pipe, following which the cooling blades in the cooling profile are bent at their base sections in such a manner that the cooling fins exhibit downwardly inclining faces. Such downward angulation can optionally be carried out immediately prior to the mounting of the fuel pipe in the vehicle by the manufacturer or the repairer of the vehicle.

BRIEF DESCRIPTION OF THE DRAWINGS

In the following, the invention will be described in further detail with reference to the accompanying drawings, wherein FIG. 1 schematically illustrates a fuel system with a profile for cooling fuel in accordance with the invention;

FIG. 2 is a cross sectional view of a profile according to a preferred embodiment of the invention;

DETAILED DESCRIPTION OF THE INVENTION

Figure 3:
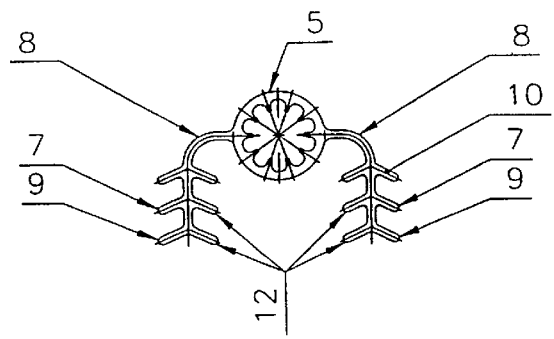
FIG. 3 is a cross sectional view of a shaped profile for use as fuel pipe according to the invention.

FIG. 1 shows the fuel system between a tank 1 and a motor 2. In an advance conduit 3 the fuel flows from the tank 1 and onwards to the motor 2. Excessive fuel is conveyed back to the tank 1 via a return flow pipe 4. In the case of a diesel-driven motor 2, a part of the fuel is used for lubrication of components such as pumps in the motor 2. Therefore, the amount of fuel conveyed to the motor 2 exceeds the amount combusted. In a diesel motor the fuel can thus be circulated in an amount of about thrice the tank volume.

The fuel is heated by passage through the motor installation 2, and accordingly it is necessary to cool the fuel in the return pipe 4. The return flow pipe 4 therefore comprises a fuel pipe according to the invention for cooling the fuel flowing therethrough to ensure that the fuel will neither destroy the tank due to too elevated a temperature, nor reduce in combustability due to a chemical reaction with material in connection with the tank. For example, instead of boiling, the fuel is kept cooled to a harmless suitably low temperature. This fuel pipe is configured in a cooling profile 5 as shown sectional views of FIGS. 2 through 4.

FIG. 2 illustrates the preferred embodiment of a pipe profile 5 for cooling fuel in accordance with the invention. The pipe profile 5 is an extruded aluminum profile that includes a centrally arranged tubular element 6 in which a flow passage 11 is configured. The pipe profile 5 is configured with two cooling blades 7 that extend outward from diametrically opposite positions on the tubular element 6. Each cooling blade 7 includes a bendable base section 8 and an outer section 9 that comprises a number of cooling fins 10. As seen from FIG. 2, the cooling surface of each of the cooling fins is inclined away from the tubular element 6.

In a preferred embodiment, the flow passage 11 in the tubular element 6 is provided with internal cooling ribs 17 whereby the cooling effect of the aluminum profile can be further increased.

Figure 4:
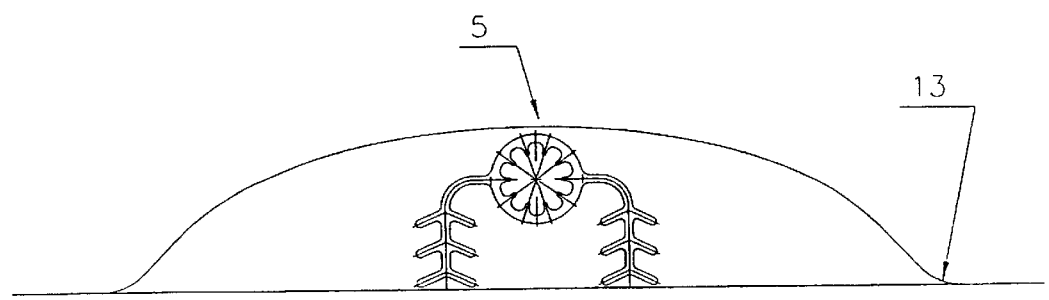
FIG. 4 is a schematical view of the bottom of a vehicle with a fuel pipe according to the invention.

As shown in FIG. 3, the cooling blades 7 can be bent at the base section 8 whereby the cooling fins 10 in the outer section 9 feature downwardly inclined cooling surfaces 12 with respect to the point at which each cooling fin is attached to a cooling blade. Thus, dirt will slide off the cooling fins 10 so that the fins continue to have a cooling effect. Angulation of the cooling blades 7 means that the cooling profile 5 according to the invention will appear compact and it will retain a highly-efficient cooling surface. It being also substantially self-cleaning, the profile 5 according to the invention is suitable for use as a fuel pipe. FIG. 4 shows how the profile 5 can be mounted underneath the bottom 13 of a vehicle.

It has been found in connection with the invention that the cooling fins 10 can alternatively or as a supplement also be configured in the bendable section 8.

Figure 5:
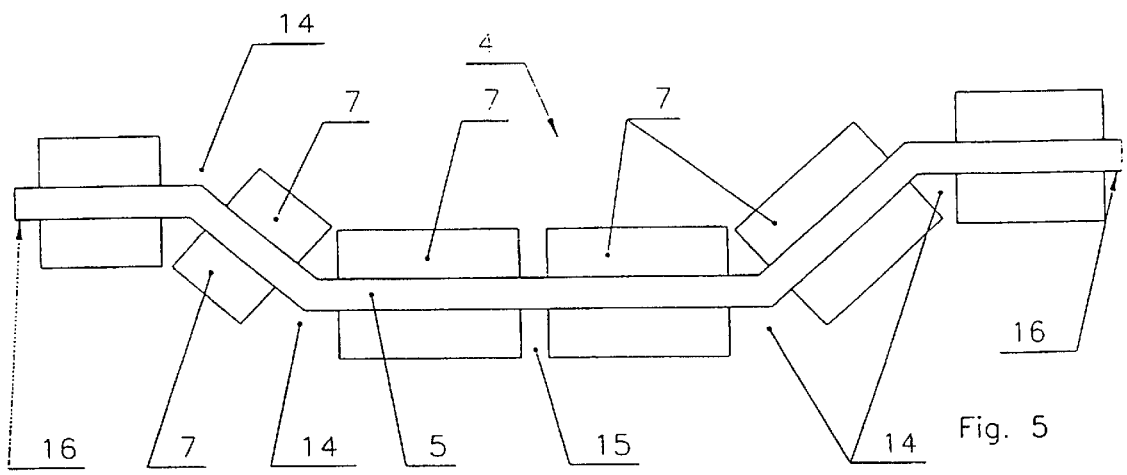
FIG. 5 is a schematical view of a fuel pipe according to the invention.

FIG. 5 shows a fuel return pipe 4 configured with the cooling profile 5 according to the invention. The pipe 4 is configured with a number of sections 14, 15, 16 wherein the cooling blades have been removed. Thus in the sections 14, the tubular element is thus essentially exposed so that bending of the tubular element is considerably facilitated. In particular, since the bends often have different orientations, the configuration of the fuel pipe is a spatial shape.

Also, the cooling blades 7 can be removed by cutting them off in one or more sections 15 in order to create space for fittings (not shown). At each of the end sections 16 of the cooling profile 4, the cooling blades 7 have also been removed which means that in the tubular element 6 a connecting branch can be configured that matches the reception opening in tank and motor installations 1,2, respectively.

It has further been found in connection with the invention that within the tubular element, two or more flow passages 11 can be extruded in the right circumstances.

In an embodiment not shown, the flow conduit is built by means of two units in that a cooling element with cooling fins and/or cooling ribs has been attached to surface portions of a tubular element. In that case, the cooling element is preferably attached to surface portions that face sideways or downwards, and the cooling fins extend outwards or downwards relative to the tubular portion. A flow conduit having this configuration is suitable for mounting underneath the bottom of a vehicle, since it is possible to arrange the cooling element(s) as desired on those areas of the tube that are not bent and where there are no fittings or the like for securing the pipe. The cooling element can be attached by, for example, solder or by deformation to the pipe in order to provide adequate heat conductivity between the tubular element and the cooling element.

What is claimed is:

1. A flow conduit comprising:
    a tubular element for conveying a liquid therein, said tubular element having an outer surface, an upper portion of said outer surface having one of a planar and a convex shape;
    cooling blades connected to and extending outward from said outer surface of said tubular element, each of said cooling blades having a base section and an outer section, and each of said cooling blades being bent downwards at said base section with respect to said tubular element; and
    cooling fins on said outer section of each of said cooling blades, wherein each of said cooling fins is connected to one of said cooling blades at a point of attachment and has a downwardly inclined cooling surface with respect to said point of attachment.

2. The flow conduit of claim 1, wherein said cooling surface of each of said cooling fins is inclined away from said tubular element.

3. The flow conduit of claim 1, wherein said tubular element, said cooling blades, and said cooling fins are integrally connected and are formed of extruded aluminum.

4. The flow conduit of claim 1, wherein said tubular element has at least one flow passage formed therein, each of said at least one flow passage having cooling ribs formed on an inner surface thereof.

5. The flow conduit of claim 1, wherein said tubular element and said cooling blades are not integrally connected, each of said cooling blades abutting against said outer surface of said tubular element.

6. The flow conduit of claim 1, wherein said cooling blades comprise two cooling blades connected to said tubular element at diametrically opposed sides of said outer surface.

7. A method of manufacturing the fuel system of claim 6, comprising:
    extruding said tubular element, said cooling blades, and said cooling fins as a single, integral unit; and
    bending said tubular element at said at least one bend area so as to shape said tubular element to fit between said motor and said tank.

8. The method of claim 7, further comprising:
    notching said cooling blades to remove at least one section of said cooling blades so as to form said at least one bend area.

9. The method of claim 7, further comprising:
    bending each of said cooling blades downwardly at said bending section such that each cooling surface of each of said cooling fins is downwardly inclined with respect to said point of attachment.

10. A vehicle fuel system comprising:
    a fuel tank;
    a vehicle motor;
    a tubular element connected to said tank and said motor for conveying fuel between said tank and said motor, said tubular element having an outer surface, an upper portion of said outer surface having one of a planar and a convex shape;
    cooling blades connected to and extending outward from said outer surface of said tubular element, each of said cooling blades having a base section and an outer section, and each of said cooling blades being bent downwards at said base section with respect to said tubular element, said tubular element including at least one bend area free of cooling blades; and
    cooling fins on said outer section of each of said cooling blades, wherein each of said cooling fins is connected to one of said cooling blades at a point of attachment and has a downwardly inclined cooling surface with respect to said point of attachment.

11. The fuel system of claim 10, wherein said cooling blades comprise two cooling blades connected to said tubular element at diametrically opposed sides of said outer surface.

12. The fuel system of claim 10, wherein said cooling surface of each of said cooling fins is inclined away from said tubular element.

13. The fuel system of claim 10, wherein said tubular element, said cooling blades, and said cooling fins are integrally connected and are formed of extruded aluminum.

14. The fuel system of claim 10, wherein said tubular element has at least one flow passage formed therein, each of said at least one flow passage having cooling ribs formed on an inner surface thereof.

15. The fuel system of claim 10, wherein said tubular element and said cooling blades are not integrally connected, each of said cooling blades abutting against said outer surface of said tubular element.

16. The fuel system of claim 10, wherein at least one end of said tubular element is free of any cooling blades and includes a coupling member connecting said tubular element to at least one of said motor and said tank.

17. The fuel system of claim 10, wherein said tubular element comprises a fuel return pipe for conveying fuel from said motor to said tank, further comprising a fuel feed pipe for conveying fuel from said tank to said motor.

* * * * *